United States Patent
McClellan

[11] 3,975,047
[45] Aug. 17, 1976

[54] AUTOMATIC DUMP TRUCK COVER

[76] Inventor: Donald McClellan, 9039 Woodridge Road, Mentor, Ohio 44060

[22] Filed: Sept. 2, 1975

[21] Appl. No.: 609,507

[52] U.S. Cl. .............................................. 296/100
[51] Int. Cl.² .......................................... B60P 7/04
[58] Field of Search ............................. 296/100, 98

[56] References Cited
UNITED STATES PATENTS

| | | | |
|---|---|---|---|
| 3,498,666 | 3/1970 | Harrawood | 296/100 |
| 3,549,198 | 12/1970 | Cappello | 296/100 |
| 3,656,802 | 4/1972 | White | 296/100 |
| 3,854,770 | 12/1974 | Grise | 296/98 |

*Primary Examiner*—Robert R. Song
*Attorney, Agent, or Firm*—Malin & Haley

[57] ABSTRACT

A dump truck bed cover and positioning mechanism which is actuated from within the cab of the truck and which eliminates the need for complex roller mechanisms. The device includes a flexible cover, the cover being affixed at one end to the forward bed of the truck, a cover windscreen, a bail having a crossmember connected to the free end of the cover and a pair of arms connected to an actuating rod which pivots the bail from a first position to a second position for covering or uncovering the load bed of the truck. The lateral sides of the cover are slidably connected to cover retaining lines which hold the cover to the bed in the covered position. In the open position, the cover is stored with a plurality of folds behind the windscreen at the forward end of the bed. A tensioning arm is connected to one end of each of the cover retaining lines to provide proper slack or tensioning of the lines. An hydraulic piston acts as a positive downlock of the bail in the open position and as a mechanical dampener during the covering operation.

4 Claims, 4 Drawing Figures

AUTOMATIC DUMP TRUCK COVER

BACKGROUND OF THE INVENTION

This invention relates generally to a cover for a dump truck bed and specifically to a cover and the actuating mechanism which allows an operator to move and maintain the cover in an open or closed position by the actuation of the mechanism without additional human intervention.

In recent years, many states have required that dump trucks or other trucks having open beds be covered while in transit, when carrying a load. Many truck bed covering devices are shown in the prior art having complex rolling mechanisms, making them more expensive to construct and more complicated to operate, the actuating mechanisms requiring the driver to leave the cab of the truck in order to actuate the cover drive mechanism. The instant invention overcomes these problems of the prior art by providing a cover for a truck bed, such as a dump truck, which eliminates the rolling mechanisms found in the prior art and which allows actuation of the covering device from both the open and closed positions by the operator from within the cab of the truck. The overall result of the instant invention is a dump truck cover and its actuating mechanism which is more reliable and efficient in operation. The overall construction cost of the device is greatly reduced by elimination of rollers.

BRIEF DESCRIPTION OF THE INVENTION

A truck bed cover and positioning mechanism connected to a truck bed which includes a windscreen disposed on the forward end of the truck bed, a tarpaulin or cover connected adjacent the windscreen to one end of the truck bed, a bail connected to the free end of said cover, an actuating rod connected to the bail which provides pivotal motion of the bail between a first position in which the truck bed is covered to a second position in which the truck bed is uncovered. A pair of cover retaining lines are disposed, one on each side of the truck bed, to which the lateral sides of the cover are slidably attached. A pair of retaining line tensioning arms, each disposed on opposite sides of the forward portion of the truck bed, are connected at their ends to pivot relative to the truck bed and at the free ends to the ends of the retaining line. Thus, each arm pivots between a first and second position such that slack may be provided in the line during the covering or uncovering operation; but, when the cover is in either position, the arm is pivoted to firmly tension the retaining line. In one embodiment, the actuating rod that moves the bail is connected to a hydraulically actuated piston and a torsion spring. The torsion spring acting on the actuating rod maintains the cover in a firm down-locked position such that the spring force biases the cover in the closed position. The bed is uncovered by the operator raising the truck bed to the dump position during a dumping operation. A cable connected between a lever on the actuating rod and the truck frame pivots the bail forward during the upward motion of the truck bed during the dumping operation. The bail actuating rod is rotated by the truck bed movement against the tension of the torsion spring, moving the cover to the bed open position, while folding the cover adjacent the windscreen at the forward end of the bed. The hydraulic mechanism includes a piston, having a one-way valve allowing free movement of the piston (and bail) to the open position, a cylinder and a solenoid actuated valve that hydraulically locks the cover in the open position. Actuation of the solenoid (with an electrical switch) in the cab of the vehicle opens a valve, allowing hydraulic fluid to flow to the other side of the piston releasing the locking force on the bail. The torsion spring force then automatically moves the cover from the open to the closed position. The hydraulic piston (in this mode of operation) dampens the motion of the bail and the actuating rod from the open to the covered position.

The bail actuating rod is attached to and disposed beneath the floor of the truck bed, the bail being attached to the ends of the actuating rod. The hydraulic piston is attached underneath the bed and coupled to the actuating rod. The torsion spring for down-locking the bail may be wrapped about and connected at one end to the actuating rod and provides a torsional force on the actuating rod (tending to rotate the rod) which keeps the bail and cover in a closed position. As the bed moves upward in a dumping operation, the cable connecting the actuating rod lever and the truck frame is tensioned, rotating the actuating rod, forcing the bail (and cover end coupled thereto) from a closed position prior to dumping to the full open position when the bed is extended to its maximum position upward from the frame of the truck. If it is desirous to uncover the bed without moving the truck bed upward, the bail may be rotated from the closed position to the open position by manually overcoming the torsion spring on the actuating rod. Once the cover is in the open position, the hydraulic piston will lock the bail in the open position, which can only be unlocked by actuating the solenoid control valve.

In another embodiment, a mechanical lock may be substituted for the hydraulic mechanism.

It is an object of this invention to provide an improved dump truck cover and actuating mechanism for moving the cover between closed and open positions.

It is another object of this invention to provide a truck covering mechanism which requires no manual intervention by the operator and which is non-complex in operation and construction.

And yet still another object of this invention is to provide a truck bed covering device which may be actuated by the truck operator from within the cab of the truck.

But still yet another object of this invention is to provide a cover for a dump truck bed which is automatically moved to an uncovered position when the dump bed is raised while dumping.

And yet still another object of this invention is to provide a truck bed cover for a dump truck which eliminates the use of rollers and includes a windscreen, a foldable covering, a torsion locking spring for the covered position of the bed and a hydraulic down-lock in the open position.

PREFERRED EMBODIMENT OF THE INVENTION

Figure 1:
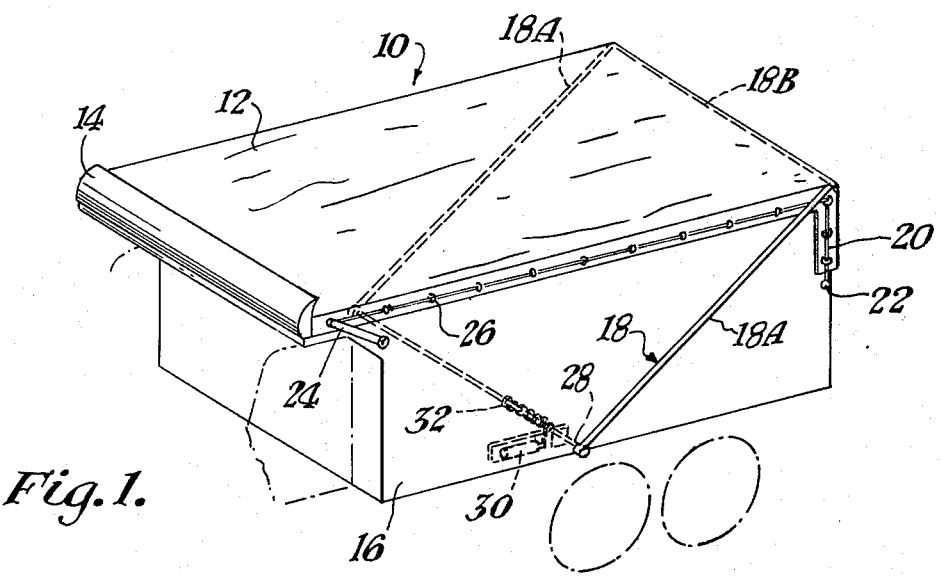
FIG. 1 shows a perspective view of the instant invention utilized on a dump truck bed with the device being in the covered or closed position. A portion of the actuating rod and the hydraulic down-lock mechanism is shown dotted.

Referring now to the drawings and especially FIG. 1, the instant invention is shown generally at 10 in a closed configuration such that the dump truck bed 16 is completely covered by tarpaulin 12 which is connected at one end toward the front of the bed adjacent a windscreen 14, completely across the front of the bed. The tarpaulin 12 is held down at the rear of the bed by the bail mechanism 18 which includes a pair of rigid arms 18A and a cross-member 18B forming a U-shaped rigid structure. The arms 18A are attached to an actuating rod 28 connected through the frame of bed 16 such that the arms pivot when the actuating rod 28 is rotated. The sides of the tarpaulin 12 are held down overlapping the sides of truck bed 16 by retaining lines 20, with one retaining line being disposed on each side of bed 16. The retaining lines 20 are looped through a plurality of fasteners 26 which are connected to the edge of the tarpaulin on each lateral side. One end of line 20 near the forward end of the bed is connected to a line tensioning bar 24 which is discussed below. The opposite end of line 20 is rigidly fixed to the bed 16 by fastener 22. Disposed about the actuating rod 28 is a torsion spring 32 which acts to keep the bail and tarpaulin 12 biased in a covered configuration. Also connected to the rod 28 is a hydraulic locking mechanism represented by cylinder 30 which is discussed below. In the covered or closed bed position, with the tarpaulin completely covering the top of the bed 16, the bail 18 is down-locked in the position shown in FIG. 1 by the spring tension from the torsion spring 32. The retaining lines 20 are made taut by line tensioning bars 24, such that, in the position shown in FIG. 1, each line 20 is tensioned, keeping the tarpaulin 12 firmly held over the truck bed 16.

Figure 2:
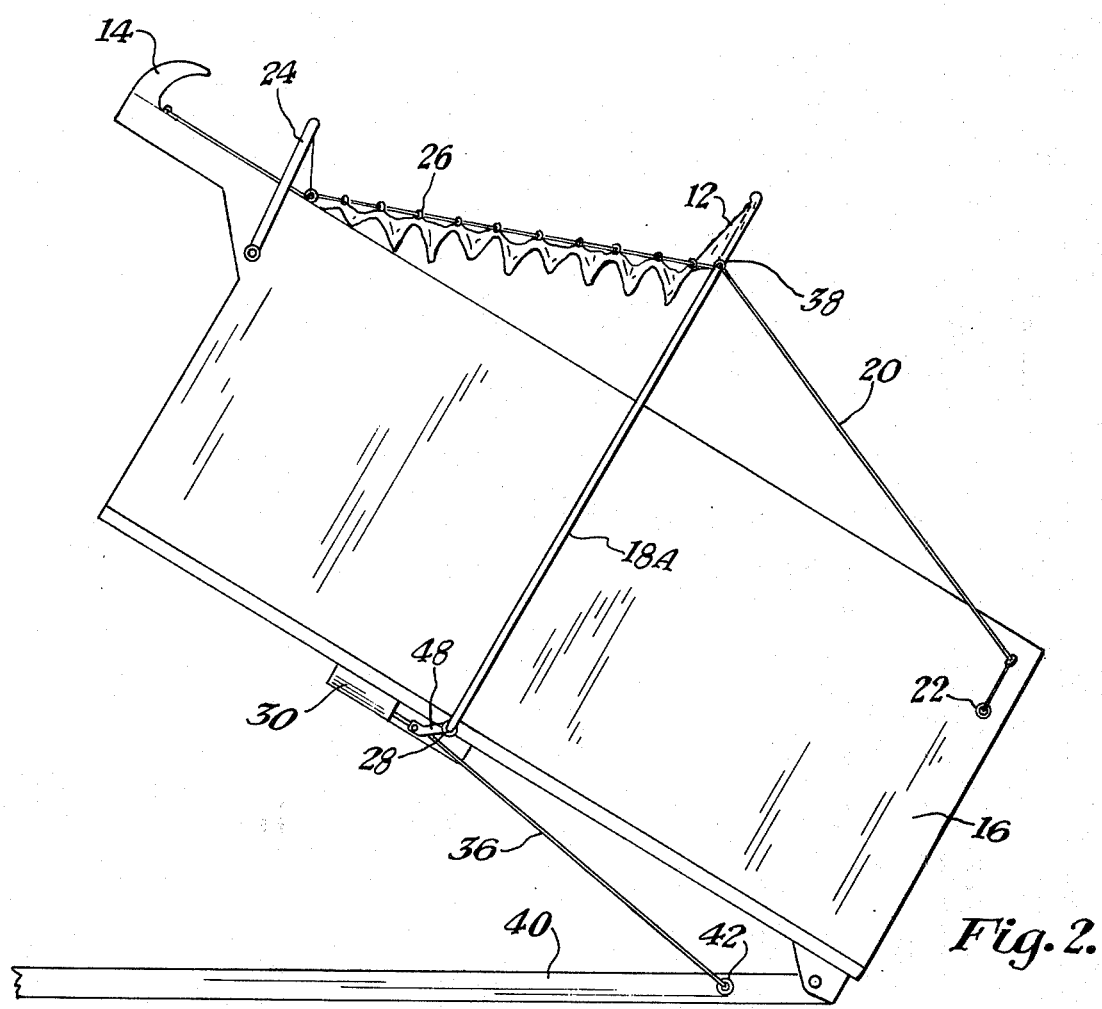
FIG. 2 shows a side elevational view of the instant invention shown during a dumping operation in which the cover is being opened.

Referring now to FIG. 2, the instant invention is shown in the operational position during the uncovering of the bed 16 as follows. The truck bed 16 is shown partially raised above the truck frame 40 during a conventional dumping operation. A cable 36 is fastened at one end to a lever 48 connected to the actuating rod 28 and at the other end to the truck frame 40 by connector 42. As the bed 16 is being raised, the actuating rod 28 being held by cable 36 is forced to rotate relative to the bed 16 causing the bail and side support arms 18A to pivot toward the front of the truck bed 16. During the covering or uncovering of the bed, the retainer line control arms 24 are pivoted to an upright position which puts slack in the retaining line 20 to allow for the arcuate movement of the bail arm 18B relative to line 22 through a shive 38 attached to the bail arm 18A. The tarpaulin 12 folds along the ring fasteners 26 as it approaches the forward end of the bed 16. The folding of the tarpaulin is continued until the bail and tarpaulin are positioned and in contact with the forward bed adjacent and behind the windscreen 14.

Figure 3:
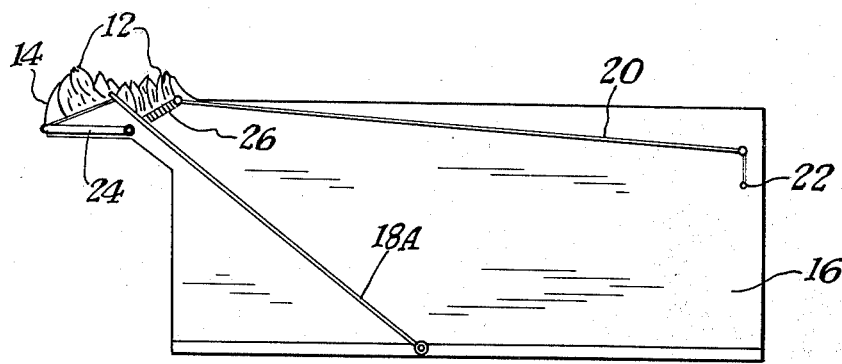
FIG. 3 shows a side elevational view of the instant invention with the cover in the open position.

FIG. 3 shows the instant invention in the open or uncovered position with the tarpaulin 12 folded and stored behind the windscreen 14 which is rigidly attached to the forward end of the bed. Windscreen 14 which is aerodynamically shaped prevents the folded tarpaulin 12 from blossoming which could damage the tarpaulin during transit with an open bed. In this position the bail and tarpaulin, including the bail arms 18A, are firmly locked open by a hydraulic mechanism which is connected to lever 48, described below. The line 20 is tensioned by moving the retaining line actuating arm 24 to a position parallel to the top of the truck bed 16.

Figure 4:
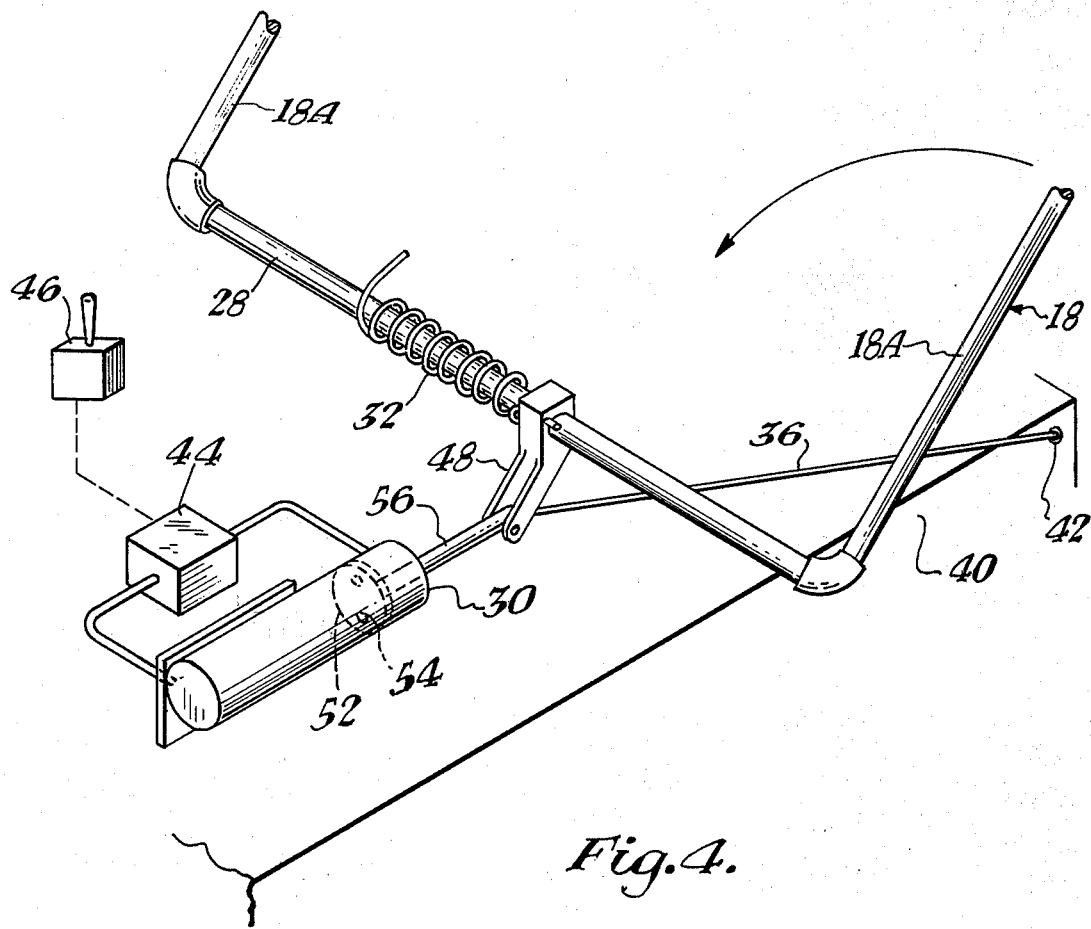
FIG. 4 shows a perspective view of the bail actuating mechanism of the instant invention.

FIG. 4 shows the bail and cover actuating mechanism for the operation of the instant invention. In order to move the bail 18 relative to the bed, actuating rod 28 must rotate relative to the bed. The rod 28 is attached beneath the truck bed floor (not shown in FIG. 4) through the lower bed frame so that it is free to rotate relative to the bed itself. The ends of the actuating rod 28 are attached to the bail mechanism (as shown in FIGS. 1–3). Rigidly attached to actuation rod 28 is a lever 48 which is connected to cable 36 anchored to the truck frame 40 by a conventional fastener 42. The hydraulic mechanism is mounted to the bottom of the bed 16 and includes a hydraulic fluid cylinder 30 having a piston 52 with a one-way check valve 54, the piston 52 being coupled to lever 48 by rigid rod 56. A solenoid actuated hydraulic fluid valve 44 is connected in fluid communication with the ends of the cylinder 30, with the solenoid 44 being actuated by an electrical switch 46 which is mounted on the dashboard of the cab. Also connected to actuating rod 28 is a torsion spring 32 which is coiled about rod 28 and is connected at one end to lever arm 48 and engages at the other end the bottom of the bed 16. The torsion spring 32 is tensioned such that the bail and cover are held in a covered or closed position by the action of the spring 32, thus acting as a down-lock to keep the truck bed covered. As the truck bed is raised during the dumping operation, bed movement and cable 36 rotates rod 28, moving the bail and tarpaulin to the forward end of the bed, uncovering the bed. This same action extends rod 56 connected to lever 48 and hydraulic piston 52 which hydraulically locks actuating rod 28 and the bail and cover in the open position. In this position, fluid under pressure prevents movement of lever 48 when the solenoid valve 44 is closed. Although the torsion spring 32 applies a force to rotate the actuating rod 28 which would tend to cover the truck bed, the piston 52 is firmly held by fluid pressure in cylinder 30 to keep the tarpaulin locked in an open position. When the solenoid valve 44 is actuated by switch 46, fluid will be allowed to flow between the sides of piston 52 releasing the fluid pressure such that the torsion spring 32 will then rotate actuating bar 28 such that the tarpaulin and bail mechanism will move to cover the truck bed. Pursuant to this operation, referring back to FIG. 2, line tensioning arm 24 is in a horizontal position when the cover mechanism is not being actuated and is rotated to an upright position to provide sufficient slack in the retaining line to allow the bail mechanism and tarpaulin to be drawn to the rear of the bed. Once the mechanism is down-locked by the torsion spring 32 to the covered position, the tension on torsion spring 32 is sufficient to hold it firmly in place. The spring tension force on the bail 18 is of such a magnitude that bail arm 18A can be manually rotated to move the cover to the open position.

Referring back to FIG. 1, the purpose of the windscreen 14 which is somewhat shaped like an air foil is to provide a barrier with reduced aerodynamic drag which protects the tarpaulin (especially when in the folded, open position when the bed is uncovered) from receiving air flow caused by the motion of the vehicle which might tend to blossom and force the tarpaulin to flap in the wind. The windscreen is firmly attached to the bed by conventional connectors and may be constructed of either metal or plastic. The bail 18 including the bail frame members 18A and 18B may be constructed of rigid hollow metal tubes while the actuating rod 28 could be constructed of a solid steel bar or rod. Referring back to FIG. 4, the one-way check valve 54 disposed in piston 52 allows the piston and rod 56 to move freely when the truck bed is being uncovered but the valve is such that the piston cannot move freely in the opposite direction. Thus, while uncovering the bed as the rod 56 is being extended, the fluid may freely flow through the piston such that it acts as a dampening device.

Although shown as an electro-hydraulic down-lock, the instant invention may in an alternate embodiment include mechanical hydraulic valve actuation or mechanical down-locks for the cover in the open position.

In another embodiment, the flexible cable 36 may be replaced by a rigid steel rod connected between the truck frame and the bail mechanism.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A covering mechanism for covering a truck bed comprising:

a flexible cover, said cover affixed at one end to said truck bed;
    a bail, said bail connected to the free opposite end of said cover;
    an actuating rod connected to the truck bed and to the free ends of said bail;
    a tensioning spring coupled to said actuating rod;
    a lever rigidly fixed to said actuating rod;
    a bail locking means connected to said lever;
    a solenoid valve in fluid communication with said hydraulic cylinder;
    a pair of flexible lines, each one coupled on opposite lateral sides of said flexible covering, said flexible lines attached at their ends to said truck bed; and
    a cable connected at one end to said lever and at the opposite end to said truck bed whereby when said truck bed is raised during the dumping operation said cover including said bail will be moved from a closed position to an open position.

2. A truck bed covering mechanism, as in claim 1, including:
    a pair of pivotable arms, each attached at one end to said truck bed and at the opposite end to one of said flexible lines.

3. A truck bed covering mechanism, as in claim 2, wherein said bail locking means includes:
    a hydraulic cylinder, said hydraulic cylinder including a piston having a one-way check valve in a closed hydraulic fluid system.

4. A truck bed covering mechanism, as in claim 3, including: a windscreen coupled to the forward end of said truck bed.

* * * * *